United States Patent
Islam et al.

[11] Patent Number: 5,855,149
[45] Date of Patent: Jan. 5, 1999

[54] PROCESS FOR PRODUCING A CUTTING DIE

[75] Inventors: Mahmud-U. Islam, Orleans; Glen R. Campbell; Gavin McGregor, both of Gloucester, all of Canada

[73] Assignee: National Research Council of Canada, Ottawa, Canada

[21] Appl. No.: 751,738

[22] Filed: Nov. 18, 1996

[51] Int. Cl.⁶ .................................................. B21K 5/20
[52] U.S. Cl. .............................. 76/107.8; 76/115; 76/116; 419/31; 419/55
[58] Field of Search .................................. 76/107.8, 115, 76/116; 83/663, 665; 419/30, 31, 38, 55, 53; 156/62.2, 272.8

[56] References Cited

U.S. PATENT DOCUMENTS

| | | | |
|---|---|---|---|
| 3,089,945 | 5/1963 | Connoy et al. | 76/112 |
| 3,991,930 | 11/1976 | Ekerot | 76/112 |
| 4,848,190 | 7/1989 | Doslik et al. | 76/107.8 |
| 5,048,182 | 9/1991 | Robbins, III | 76/107.8 |
| 5,053,090 | 10/1991 | Beaman et al. | 156/62.2 |
| 5,575,185 | 11/1996 | Cox et al. | 76/107.8 |
| 5,640,667 | 6/1997 | Freitag et al. | 419/31 |
| 5,697,043 | 12/1997 | Baskaran et al. | 419/30 |

*Primary Examiner*—M. Rachuba

[57] ABSTRACT

A process for producing a cutting die having a metal base which carries a sharpened ridge extending along a predetermined path thereon, in which a supply of powdered metal and a laser beam are moved along the path so as to surface melt a thin layer of the metal base with the metal powder and thus form a band of fused metal powder along the path, this step being repeated to form additional layers metallurgically bonded to the base and to each other, until a ridge of metal is formed. The ridge is then sharpened to suit it for use in cutting. The ridge may have a top surface of harder material than the inner part of the ridge. The laser and powder delivery movements may be controlled by a CNC (computer numerical control) motion system. The invention includes novel dies produced by this process.

16 Claims, 3 Drawing Sheets

PROCESS FOR PRODUCING A CUTTING DIE

BACKGROUND OF THE INVENTION

1. Field of the Invention

The present invention relates to a process for producing the cutting dies normally used in rotary and reciprocating die cutting machines. The dies are suitable for cutting a wide variety of shapes on paper, plastics, foils, diapers, etc.

2. Prior Art

It is usual to cut shapes from sheet material such as paper, plastics, and foils, using a cutting die which comprises a ridge or ridges of sharpened metal projecting from a base, and which cuts the material by pressing this against a plain anvil. Commonly, the dies are rotary, i.e. cylindrical, and are positioned in a die station equipped with an anvil roll, the material being cut when passing between the rotary die and the anvil roll while these rolls rotate in opposite directions. The ends of the die have slightly enlarged cylindrical surfaces termed "bearers" which contact suitable support surfaces to properly position the die. The die station also includes drives, support rolls, wiper assemblies for lubricant, and some means, usually hydraulic, to apply the proper cutting load between the rotary die and the anvil roll, and to adjust the height so that the machine can cut to a specific depth.

In some cases it is required that the dies be accurately enough made to cut only one or two outer layers of a paper laminate, leaving a backing layer uncut.

Cutting dies are usually made by machining metal away from a metal base to leave ridges which are then heat treated and sharpened. The machining operation is a major step and a major expense. For a rotary die, bar stock with a diameter slightly bigger than the biggest required diameter of the die is turned on a lathe. Required end and bearer diameters are machined, leaving the central area for the machining of the cutting pattern. This cutting pattern is first rough machined and then finished using a CNC (computer numerical control) milling machine. The entire die is made oversize to allow for the distortion which occurs during heat treatment. Depending on the complexity of the pattern and the height of the required cutting edges, the milling operation may take from a few hours to days or even weeks. For sharp corners, small diameter cutters are required, which further adds to the manufacturing time.

The machining operations are performed on the tool steel bar stock from which the die is made, when the material is in the relatively soft condition as initially received; the steel then requires heat treating to bring it to the required hardness of about RC 54–60. This usually means that the dies have to be sent out to a commercial heat treater. Although the heat treatment, namely hardening and tempering, can be done in a few hours, the return time from the heat treaters may be several days. Heat treatment is also problematical in that improper treatment may lead to cracking which destroys the die. Distortion also commonly occurs; this may need to be corrected or may mean that the die has to be scrapped.

After heat treatment, the die is ground to the finish dimensions on a cylindrical grinder. If the distortion caused by heat treatment is bad, centers have to be re-machined for proper grinding.

The final major operation is the sharpening process. The sharpened edges must be slightly below the bearer diameter. Edges are hand sharpened, by a scraping process, to give a sharpened edge at the specified diameter. The cross-section of the sharpened edge depends on the final application, and ranges from an inverted "V" with either acute or obtuse angle to a rounded top on the "V".

It will be clear that this standard machining operation is time consuming and expensive in relation to the amount of material which has to be removed, and that the need for heat treatment is also a disadvantage. The machining operation also imposes some limitations on shapes that can be cut, i.e. acute inside angles and sharp inside bends are not possible with conventional machining methods and may require special electro-machining.

The present invention provides a process which entirely or largely avoids the need for removing metal by machining; instead the invention provides for the addition of metal to a base. The need for conventional heat treatment is also avoided.

SUMMARY OF THE INVENTION

In accordance with the present invention, a process for producing a cutting die having a metal base which carries a sharpened ridge extending along a predetermined path, comprises the steps of;

a) supplying powdered material to said predetermined path and moving a laser beam along the path so as to surface melt a thin layer on the metal base along the path with the metal powder and thus deposit a layer of fused metal powder along the path, b) repeating step a) so as to heat and melt a thin layer of the previously deposited metal along with the metal powder to form an additional layer metallurgically bonded to the first layer, and.

c) repeating step b) to produce multiple layers until a ridge of metal is formed along the path, this ridge having a substantially uniform height and width.

Normally, movement of the laser beam along the path will be accomplished by moving the base while the beam remains stationary. However, in some cases the laser and powder delivery unit can be mounted on a robotic arm or other positioning device and moved to obtain additional degrees of freedom in making certain shapes.

The ridge so formed is then sharpened to suit it for use in cutting. As indicated above, this "sharpening" may be merely a shaping process which produces a suitable shaped but normally rounded top to the ridge, and may be performed by conventional means. Usually, the sharpened ridge is in the form of a closed loop.

The invention also includes a cutting die having a sharpened ridge extending along a predetermined path on a metal base, the ridge being built up of fused powdered metal which has been deposited on the base by the method described above. The cutting die may have top layers of its ridge formed of different material from that of the base, such different material being harder and/or more wear resistant than the material forming most of the ridge.

BRIEF DESCRIPTION OF THE DRAWINGS

A preferred embodiment of the invention will now be described by way of example with reference to the accompanying drawings, in which.

DETAILED DESCRIPTION.

Figure 1:
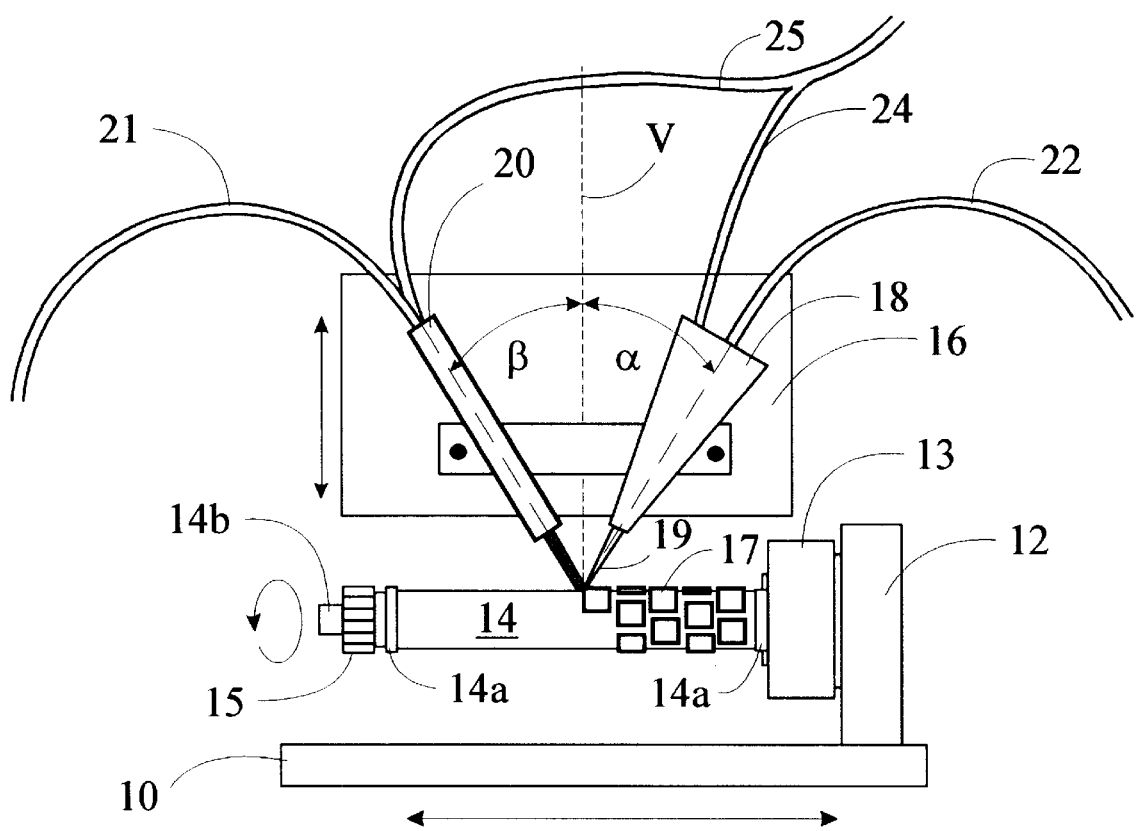
FIG.1 is a diagrammatic representation of apparatus used for producing ridges of hard metal on a cylindrical metal base, in the making of a rotary die, the apparatus having single, separate laser nozzle and powder delivery tube.

FIG.1 schematically shows the set-up used for this invention. The machine has a table 10 with support 12 which has a computer controlled rotary chuck 13 for rotating a cylindrical metal workpiece or base 14. This base has enlarged "bearers" 14a close to each end, these being surfaces for locating an anvil roll, beyond which are bearings 14b. Near an outer end is a gear with teeth 15. The table is also provided with means for translational movement parallel to the axis of the base. Above the base a head 16 supports a laser nozzle 18 which directs a laser beam 19 inclined at an acute angle α° to the vertical V, and also supports a metal powder delivery tube 20 which has its axis oppositely inclined at β° to the vertical. Powder is fed to this tube by conduit 21. The laser producing the beam is preferably of the Nd:YAG type, mounted separately, the laser light being transmitted to the nozzle by the optical fiber 22. Both the laser nozzle and the powder delivery tube are connected by conduits 24 and 25 to a source of shielding gas such as argon; this acts as a carrier for the powder and also helps to protect the laser source inside nozzle 18 from molten metal spatter.

While the Nd:YAG type laser with fiber optic beam delivery has been used for this process, other lasers without fiber optic beam delivery, or a carbon dioxide laser, could also be used.

The head 16 is fixed against movement in the horizontal plane, but is computer-controlled to move vertically as layers of material are built up on the base. The head therefore provides a Z-axis component of movement, while the table provides an X-axis component and the rotation of the chuck 13 provides a Y-axis component. The arrangement is such that any desired shape of ridge, such as die ridge 17, can be built up on the base by suitable movements of the table 10 and rotation of the chuck 13 while the laser 18 heats the surface of the base and while the tube 20, moving concurrently with the laser, delivers powdered metal to the heated area on the base.

In operation, the laser melts a thin surface layer of the base, or of the previously deposited metal, along with the powder being delivered through tube 20, to create a layer or band of fused metal powder of known height and width. The head 16 then raises the laser nozzle 18 and tube 20 by a predetermined amount, for example a few thousands of an inch, and a further layer is formed on the first; this time the powder and a part of the previous layer are melted. This continues until the desired height of ridge is achieved.

Control of the process is by a CAD (computer aided design) package. The CAD file, through the use of suitable software, is sliced into layers of known thickness, this being controlled by the process parameters. The sliced layers are used to move the rotary and transverse direction movements on the CNC controlled motion system. The program not only determines the path of movement of the laser beam and delivery tube combination, but also determines the vertical movement of the head 16 needed to produce layers which have a build-up height determined by the operating parameters.

The process will usually be continued until a ridge just slightly higher than the design height is achieved, this being then ground down to the desired final height. Sharpening can then be performed, using conventional hand sharpening.

Finally, depending on the metal used, a heat treatment step may be performed using the same laser beam as used in the forming process. This laser heat treatment step is also conveniently performed on the bearer surfaces 14a and on the gear teeth 15 at the end of the base.

In one successful test, the following parameters were used:

Powder particle size: −53 to +22μm;

Powder composition: typical stainless steel with approximately the following composition range (element, %): C 0.024; Si 0.45; Mn 1.42; P 0.027; S 0.003; Cr 16.4; Ni 10.4; Mo 2.23.

Powder feed rate: from 4 to 12 gm per min;

Shielding gas: argon at 15 cfh;

Angle α of laser beam: 15° from vertical;

Angle β of powder nozzle: 18.5° from vertical;

Laser Nd:YAG; energy: 6 to 12 J/P, 60 to 120 watts average power, beam spot size 0.020 to 0.060 inch diameter;

Travel speed: 0.03 to 0.09 inches/sec;

Typical layer thickness of 0.0061 inches, with a wall width of 0.039 inches can be produced. The total height of the built up area is dependent on the number of layers.

Using this system ridges can be produced having no porosity or less than 0.1% porosity, and having cutting edges with a hardness of 54 to 60 Rockwell, as with known processes, and with suitable metal powder can also produce significantly higher hardnesses, of over 68 Rockwell.

It has previously been reported that where a single vertical laser is used with a single side powder delivery tube the rate of deposition depends on the relative direction of movement between the base and the laser/tube combination; such reports are referred to in Applicants' U.S. Provisional Application No. 60/025,770, filed Sep. 23,1996. This variation in deposition rate is of course undesirable in making dies, since there are frequent changes in direction and uneven build up of metal would necessitate much grinding. The aforesaid Provisional Application describes Applicants' discovery that with the arrangement shown, satisfactory results are produced if both the powder tube and the laser nozzle are in the same plane and oppositely angled to the vertical, and if the angles α and β are 5° to 45°. It has been found that using these orientations, the rate of build up of the layers of material is independent of the direction of relative movement between the base and the laser and delivery tube combination.

Figure 2:
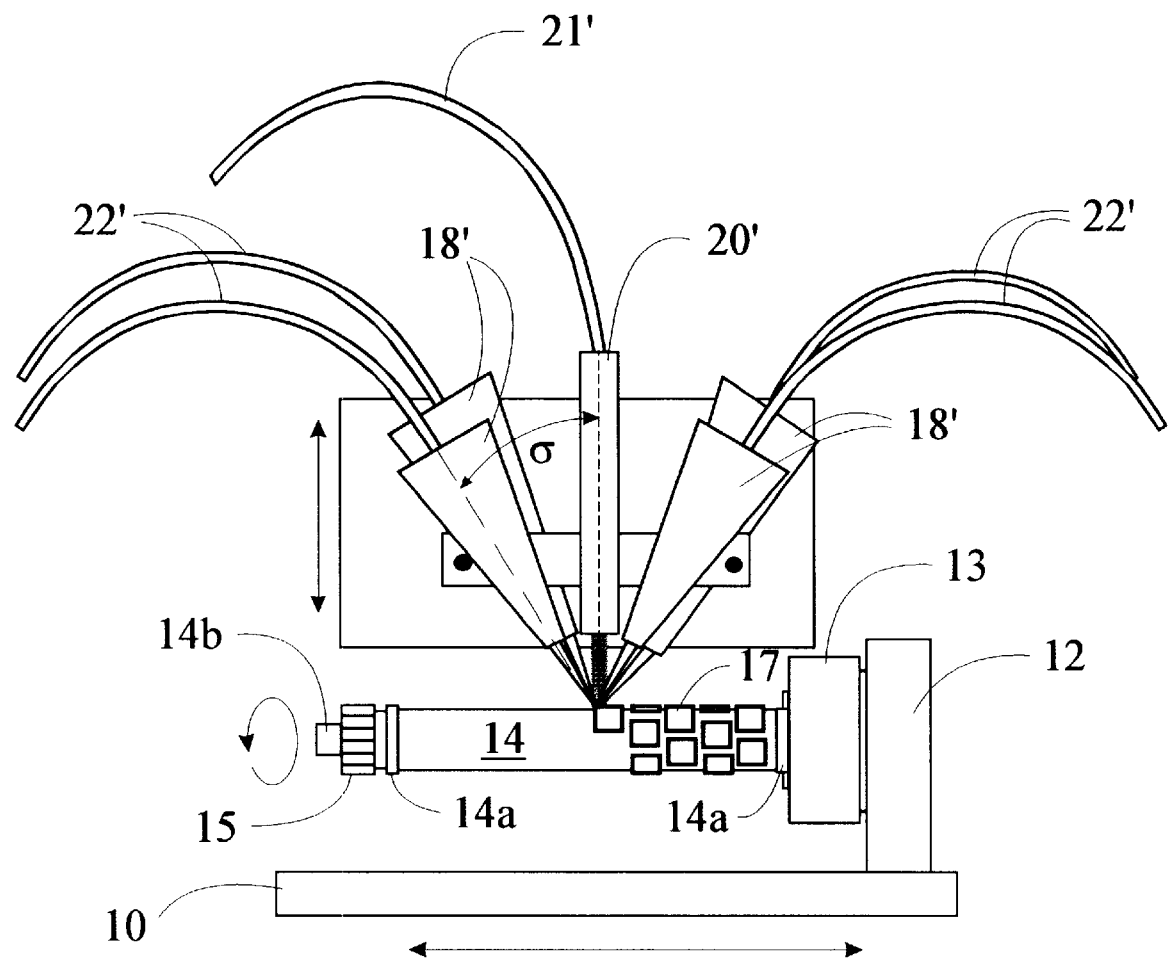
FIG.2 is a drawing similar to FIG.1 of a similar system but using four laser beams.

An arrangement giving some advantages in flexibility, and having less criticality in relation to the angles used, is shown in FIG.2. This arrangement is also described in Applicants' aforesaid U.S. Provisional Application. This uses two, three, four or more laser nozzles arranged evenly around a central powder delivery tube, and directed inwardly at equal inclinations to the powder tube. The powder tube is normal to the workpiece surface being treated, and is usually vertical. The four laser version of this arrangement will be described in more detail with reference to FIG.2.

As shown in FIG.2, a central powder delivery tube 20' connected to a powder conduit 21' and having a vertical axis is surrounded by four equally spaced laser nozzles 18'. Each nozzle is inclined inwardly, at the same angle δ to the vertical, towards the axis of the delivery tube so that the nozzle axes meet that of the delivery tube at or close to a common location at the top of the cylindrical base 14. The angle of inclination σ is preferably between 5° and 45°.

When viewed from the top the laser nozzles are spaced equally around tube 20', 90° apart. The laser nozzles and the powder tube are each connected to a shielding gas conduit (not shown). All four laser nozzles may each have a separate small laser, or all four laser nozzles may be supplied with laser light from a single laser provided with a beam splitter which divides the laser beam into four beams which are then transmitted to the laser nozzles by optical fibers 22'; alternatively each nozzle could have its small laser. These laser beams form a melt pool into which the powdered metal is fed.

This arrangement is less critical in relation to laser angles and positions than is the single laser version shown in FIG.1. It also has the advantage of allowing control of the wall thickness which can be produced since the lasers can be either all focussed on the same location to provide laser energy on a small area, or can be focussed on slightly spaced areas to produce a bigger spot to create thicker walls.

A further advantage of the multiple laser beams is that pre-heating and post-heating of the built-up layer can be accomplished in a single pass. Pre- and post-heating becomes very important when hard materials, which are sensitive to thermal shock, or materials that undergo cooling rate dependent transformations, are used for building up parts. Using the FIG.2 arrangement, one beam can be focussed ahead of the point of build-up for pre-heating, while another beam can be made incident at a spot behind the point of build-up for post-heating and controlling the cooling rate.

Figure 3:
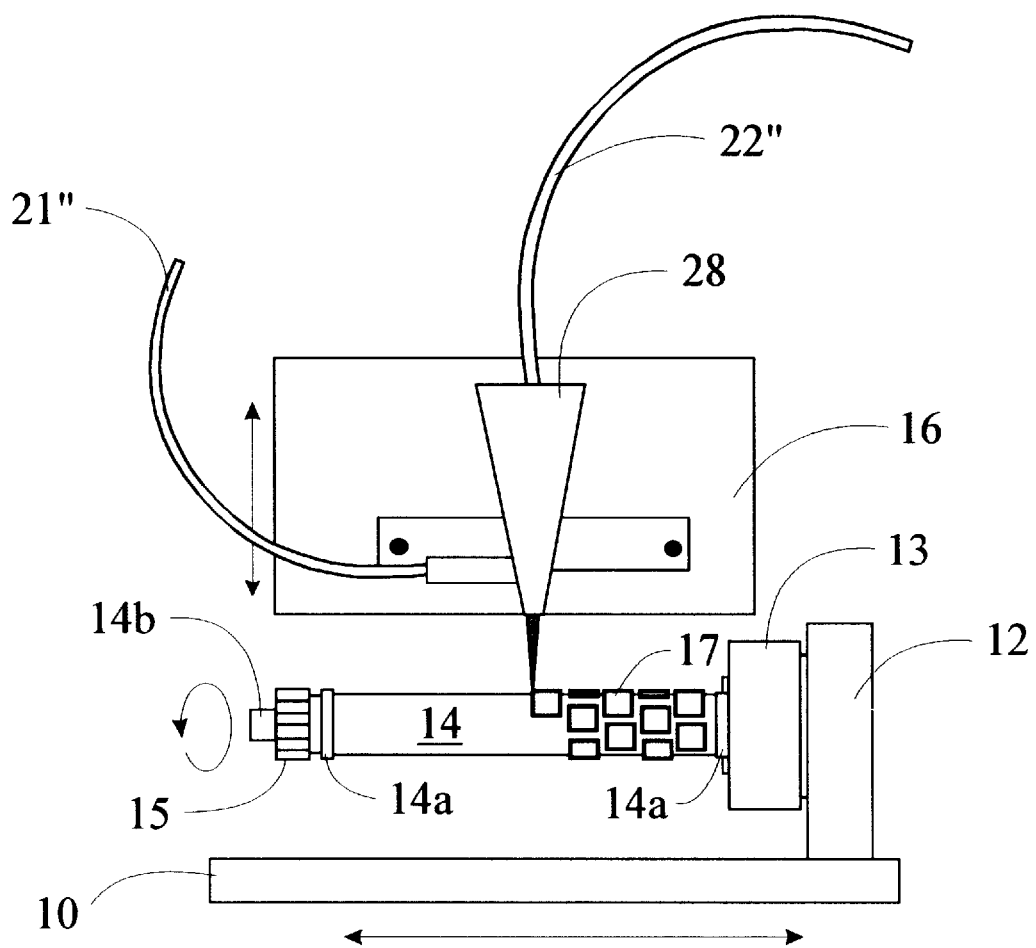
FIG.3 is a drawing similar to FIG.1 of a similar system but using a co-axial arrangement of laser and powder delivery tube.

FIG.3 shows a co-axial delivery system, using the same arrangement of base, supports and head as previously described. Here a combined laser nozzle and powder delivery tube 28 is used, having a vertical axis which is radial to the cylindrical base 14. A flexible powder delivery tube 21" feeds powder into the centre of nozzle 28, while laser light is transmitted to the nozzle by optical fiber 22". Shielding gas delivered to the nozzle carries the powder out of the nozzle co-axially with the laser beam.

One of the major advantages of this process is its flexibility in the selection of the cutting ridge material and the base material. The base material need only provide support to the cutting edges without undue flexing, so low cost plain carbon steel can be used instead of expensive tool steels used in the conventional process. For the cutting ridge there are the following options:

1. Building the entire ridge with heat-treatable steel, and performing the necessary heat treatment with the laser or lasers.

2. Building the entire ridge, including the cutting edge, using a wear resistant material such as "Stellite" (tradename for cobalt/chromium alloy having Co-64%; Cr-26%; W-4%, C-1%; Si-1%).

3. Building the main part of the ridge (about 75%) with iron base powder and forming the top layers with a WC-Co (tungsten-carbide with cobalt) type hard facing material, commonly available in powder form; or 4. Using special composition materials to further improve the life of the cutting edges.

If material powders, such as WC-Co or "Stellite", are used to create the top layers, the hardness will depend on the nature of powder material used; these materials do not require heat treatment. For these materials, the hardness will depend on the nature of the powdered material; with WC-Co the hardness can be as high as 1200 to 1600 DPH (diamond pyramid hardness), which is well over Rockwell 68 hardness.

We claim:

1. A process for producing a cutting die having a metal base which carries a sharpened ridge extending along a predetermined path thereon, said ridge being of a composition distinct from said base, comprising the steps of;
    a) moving a laser beam along said path to heat the base metal and simultaneously supplying powdered metal having a composition distinct from said base to said predetermined path via a tube moving concurrently with said laser beam so that said laser beam surface melts a thin layer of the metal base along said path and also melts the metal powder being delivered to the base and thus forms a band of fused metal powder along said path,
    b) repeating step a) so as to heat and melt a thin layer of the previously deposited metal along with additional metal powder to form an additional layer metallurgically bonded to the first layer, and
    c) repeating step b) to produce multiple layers until a ridge of metal is formed along said path, said ridge having a substantially uniform height and width, and
    d) sharpening the ridge so formed to suit it for use in cutting.

2. A process according to claim 1, wherein the metal base is cylindrical, the process including rotating the base to provide one component of relative motion between said base and said laser beam.

3. A process according to claim 1, wherein the said ridge is in the form of a closed loop.

4. A process according to claim 1, wherein, after said sharpening step, said ridge is heat treated using heat from said laser beam.

5. A process according to claim 4, wherein the metal base is cylindrical and has a gear wheel formed integrally therewith, and wherein said gear wheel is hardened by heat treatment also using said laser beam.

6. A process according to claim 1, wherein, after said ridge has been formed, the process is continued with a powder distinct from said metal powder to add a layer of material of increased hardness or wear resistance to said ridge.

7. A process according to claim 6, wherein said ridge has an outer edge with a hardness of at least 54 Rockwell.

8. A process for producing a cutting die having a metal base which carries a sharpened ridge extending along a predetermined path thereon, comprising the steps of;
    a) moving a laser beam along a said predetermined path to heat the base metal and simultaneously supplying powdered metal to said path via a tube moving concurrently with said laser beam, said tube and said laser beam each having an axis lying at 5° to 45° to the vertical, said axes being on opposite sides of said vertical, whereby said laser melts a thin layer of the metal base along said path and also melts the metal powder being delivered to the base to thus form a band of fused metal powder along said path;
    b) repeating step a) so as to heat and melt a thin layer of the previously deposited metal along with additional metal powder to form an additional layer metallurgically bonded to the first layer, and
    c) repeating step b) to produce multiple layers until a ridge of metal is formed along said path, said ridge having a substantially uniform height and width, and
    d) sharpening the ridge so formed to suit it for use in cutting.

9. A process according to claim 8, wherein the metal base is cylindrical, the process including rotating the base to provide one component of relative motion between said base and said laser beam.

10. A process for producing a cutting die having a metal base which carries a sharpened ridge extending along a predetermined path thereon, comprising the steps of;
   a) moving at least two laser beams along said path to heat the base metal and simultaneously supplying powdered metal to said path via a tube having a vertical axis and moving concurrently with said laser beams, said laser beams being positioned around said tube and directed inwardly towards a location at which the axis meets the base, with said laser beams being inclined at equal angles to said tube, whereby said laser beams melt a thin layer of the metal base along said path and also melt metal powder being delivered to the base and thus form a band of fused powder along said path,
   b) repeating step a) so as to heat and melt a thin layer of the previously deposited metal along with additional metal powder to form an additional layer metallurgically bonded to the first layer, and
   c) repeating step b) to produce multiple layers until a ridge of metal is formed along said path, said ridge having a substantially uniform height and width, and
   d) sharpening the ridge so formed to suit it for use in cutting.

11. A process according to claim 10, wherein at least three laser beams are positioned around said tube and are directed at equal angles to said tube axis.

12. A process according to claim 10, wherein at least four laser beams are positioned around said tube and are directed at equal angles to said tube axis.

13. A process according to claim 10, wherein said equal angles are between 5° and 45°.

14. A process according to claim 10, wherein the metal base is cylindrical, the process including rotating the base to provide one component of relative motion between said base and said laser beam.

15. A process for producing a cutting die having a metal base which carries a sharpened ridge extending along a predetermined path thereon, comprising the steps of;
   a) moving a laser beam along said path to heat the base metal and simultaneously supplying powdered metal to said path via a tube moving concurrently with said laser beam, said tube being coaxial with said laser beam, whereby said laser beam melts a thin layer of the metal base along said path and also melts metal powder being delivered to the base and thus forms a band of fused powder along said path,
   b) repeating step a) so as to heat and melt a thin layer of the previously deposited metal along with additional metal powder to form an additional layer metallurgically bonded to the first layer, and
   c) repeating step b) to produce multiple layers until a ridge of metal is formed along said path, said ridge having a substantially uniform height and width, and
   d) sharpening the ridge so formed to suit it for use in cutting.

16. A process according to claim 15, wherein the metal base is cylindrical, the process including rotating the base to provide one component of relative motion between said base and said laser beam.

* * * * *